Patented July 4, 1933

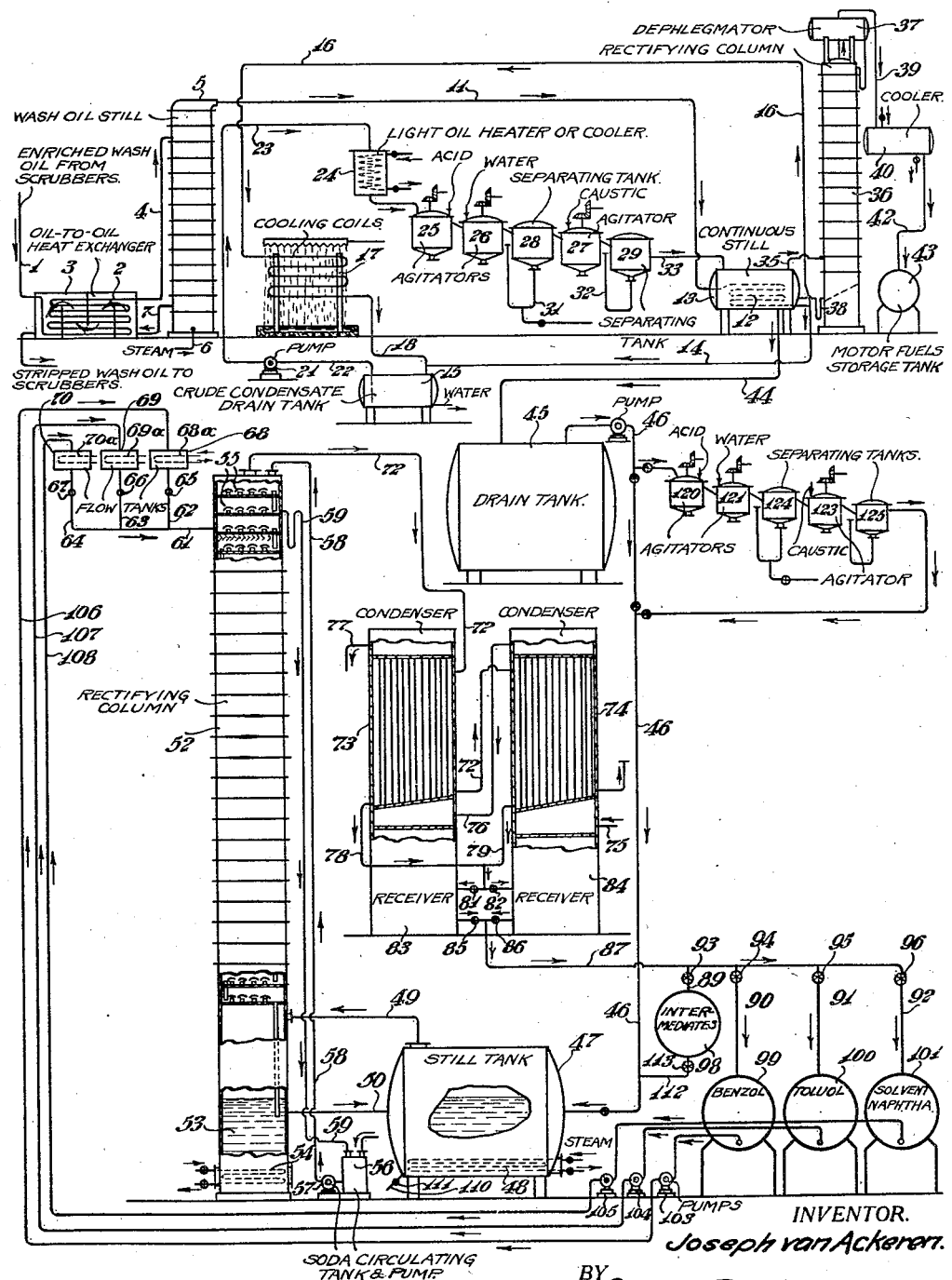

1,916,349

UNITED STATES PATENT OFFICE

JOSEPH VAN ACKEREN, OF O'HARA TOWNSHIP, ALLEGHENY COUNTY, PENNSYLVANIA, ASSIGNOR TO THE KOPPERS COMPANY OF DELAWARE, A CORPORATION OF DELAWARE

RECOVERY OF HYDROCARBON OILS

Application filed July 22, 1930. Serial No. 469,702.

This process relates to the recovery and purification of hydrocarbon oils and more particularly benzenoid hydrocarbon oils such as are recovered from fuel gases such as coal gas, coke oven gas, water gas and the like.

Such gases, when produced, contain considerable amounts of benzol, toluol, xylols and other analogous substances of great value and the recovery of these materials from the gas is commonly practiced where the conditions under which the gas is employed do not require their retention in the gas.

It is the practically universal process, in this country at least, to remove these substances from the gas while washing the gas with a relatively heavy absorbent oil. This wash oil is continuously recirculated through a cycle comprising an absorption stage where it is brought into intimate contact with the gas for the absorption of the so-called "light oils" therefrom, and a stripping stage wherein the recirculating wash oil is steam distilled for the removal therefrom of a portion or all of the substances removed from the gas. The condensate ordinarily collected from the stripping still or wash oil, as it is commonly called, consists of a mixture of the various benzenoid and analogous substances removed from the gas and is known as "crude light oil".

The crude light oil is commonly treated to recover therefrom the various constituents in more or less purified condition.

All of such treatments comprise a combination of washing and distilling operations, the exact nature and sequence of which depends upon the nature of the final products desired.

An object of the present invention is to provide an improved process for recovering benzenoid hydrocarbon oil from fuel gas.

A further object of the present invention is to provide an improved process for recovering benzenoid hydrocarbon oils from a mixture comprising the same such as the crude light oil obtained from coal gas in the manner recited hereinabove.

My invention has for further objects such other operative improvements and advantages as may hereinafter be found to obtain.

My invention contemplates the treatment of the gas with absorbent oil for the removal of the light oils in the usual manner. The wash oil is also distilled with steam in a stripping still of the conventional type but the usual heat exchange operations incident to such distillation are considerably modified and simplified. Insofar as the recirculating absorbent oil is concerned the only heat exchange operation taking place is the usual oil-to-oil heat exchange between the cooled and enriched wash oil entering the stripping still and the other stripped wash oil leaving the same. The usual vapor-to-oil heat exchange operation between the light oil and steam vapors leaving the wash oil still and the enriched absorbent oil entering it is omitted.

In its place, my invention contemplates an exchange of heat between the light oil and steam vapors leaving the wash oil still at any time and condensate from previously produced vapors from the same source.

This method of heat exchange is particularly advantageous because it permits the vaporization and separate recovery of a considerable portion of the light oil condensate and moreover, is particularly adapted for combination with a continuous oil washing process such, for example, as that described and claimed in the copending application for U. S. Letters Patent of Alfons Kemper, Serial No. 465,308, filed July 2, 1930.

More specifically, the crude light oil condensate obtained from the wash oil still contains a relatively small number of constituents. The principal constituent which may comprise up to 60% of the crude light oil is benzol, having a boiling point of 80.2° C. The constituent present in the next largest quantity is toluol which has a boiling point of 110.7° C. and may be present in amounts up to 17% of the total light oil. The crude light oil also contains xylols having boiling points ranging from about 138° C. to 144° C. which may be present up to 10% of the total light oil.

The oil also contains small amounts of constituents known as "fore-runnings" which are even more volatile than benzol and a number of other constituents of higher boiling points. A number of the latter are difficult to separate by distillation alone from the oils comprising the bulk of the total of the crude light oil. For the purpose of separating these constituents the oil is ordinarily treated with sulphuric acid to either remove these materials in the form of sludge or to convert them by polymerization or otherwise into substances which remain in the oil but which have much higher boiling points so that they are capable of being separated from the more volatile constituents of the crude light oil.

According to that portion of my process which is described hereinabove, the condensate which is obtained from the wash oil still is subjected to a preferably continuous washing operation with sulphuric acid for the purpose above described either with or without the production of acid sludge and is then subjected to heat exchange with subsequently produced vapors from the same source.

These vapors are removed from the wash oil still at such a temperature and in such volume as to enable the volatilization and separation from the previously produced condensate of substantially all of the fore-runnings and benzol contained therein but without, however, effecting the removal of any substantial portion of the less volatile constituents such as toluol. This method of procedure has the advantage that the subsequent distillation of the largely debenzolized light oil is simplified and shortened.

The fore-runnings and benzol may be condensed either together, in which case they are suitable for motor fuel without further separation, or separately, in which case it is possible to recover the benzol in substantially pure form.

My invention further contemplates an advantageous method of accomplishing the distillation of either the substantially debenzolized light oil produced according to the process described hereinabove, or crude washed light oil produced in the usual manner of the prior art.

Attempts have recently been made to accomplish the distillation of the crude light oil, even when substantially pure products are desired, in a continuous manner, but it has been found that under ordinary conditions such continuous methods are not desirable, by reason, among other things, of the greater complication of apparatus, the complexity of control required and the difficulty of compensating for even slight variations in the constitution of the material being distilled.

Consequently, I provide an intermittent process for distilling a mixture of hydrocarbons such as light oil, which is especially adapted for the recovery of the more important constituents in substantially pure form, i. e., as "pure products", and in which the disadvantages of the continuous method referred to hereinabove are avoided.

In general my process comprises charging a batch of the mixture of oils to be refined into a still, applying heat to volatilize a portion of the same until all the desired volatiles are removed, during the distillation conducting the volatilized vapors through a relatively tall rectifying column of conventional or other suitable type, and introducing to the rectifying column at a point considerably above the point of introduction of vapors from the still a reflux which approximates as closely as possible the principal constituent being volatilized at any time, or the selective recovery of which is desired.

In this manner, any vapors of constituents having boiling points higher than that of the constituent whose recovery in uncontaminated form is desired, which manage to pass through the fractionating column, are brought into contact with a reflux consisting of the lighter constituent, in liquid form.

Since contact of a relatively low boiling material in the liquid phase with a relatively high boiling material in the vapor phase represents an unstable condition, an equilibrium tends to be re-established, resulting in the condensation of the higher boiling constituent and a corresponding volatilization of the lower boiling constituent. The vapors emerging from the fractionating column are therefore caused, so long as the mixture being distilled contains any material proportion of the lower boiling constituent, to consist substantially entirely of the latter, thus enabling the recovery thereof in substantially pure form.

In any intermittent process of this character, however, even when the fractionating apparatus employed is of considerable size and efficiency, a certain amount of intermediate products are obtained. Thus when the proportion of the lowest boiling constituent in the mixture falls to a very low point, it is difficult to remove it without removing a portion of the next higher boiling constituent at the same time.

I therefore provide for reducing the period during which intermediate products are obtained, by discontinuing the addition of reflux at such time as the proportion of the lowest boiling constituent present in the mixture being distilled falls to such a point that it can no longer be obtained in substantially pure form. The distillation is then continued without the addition of reflux until the lowest boiling constituent is eliminated, and at the expiration of this period, refluxing is again commenced, using a reflux consisting of the constituent having a boiling point next above that of the constituent whose recovery and elimination has just been effected.

Obviously, during this period of operation without the use of reflux, some intermediate is obtained. However, according to the process of my invention, the intermediate is reduced to a minimum, and can be added to the next batch for re-running, without adding to the proportion of intermediate which will normally be produced in that run.

By way of illustrative example, it may be assumed that the still is charged with a mixture containing benzol, toluol and higher boiling substances, and that it is desired to recover benzol and toluol in substantially pure form respectively and a portion of the higher boiling substances in the form of solvent naphtha and consisting largely of the xylols. At the time the distillation is started, a reflux is employed consisting of substantially pure benzol and the addition of this reflux causes the vapor from the still to consist for the maximum period of substantially pure benzol.

After a certain time, however, the content of benzol in the mixture being distilled falls to such a point that the condensate begins to show contamination with toluol. the next higher boiling constituent. At this time the refluxing of substantially pure benzol is discontinued and the distillation is continued without the addition of reflux until the presence of benzol in the mixture being distilled in the still tank and rectifying tower is eliminated. During this period, the condensate from the distillation operation consists of so-called "intermediate" containing both benzol and toluol and this intermediate oil is collected separately from the benzol previously collected and the toluol subsequently to be collected, and is reserved for re-running.

At the termination of the intermediate period, that is when the condensate begins to show that benzol has been eliminated from the mixture being distilled, refluxing is recommenced, this time with a reflux consisting of substantially pure toluol. The distillation then continues, the vapor coming off the rectifying column consisting of substantially pure toluol until the toluol in the mixture being distilled falls to such a point that the condensate begins to show traces of higher boiling constituents.

At this point, the refluxing of toluol is discontinued and the distillation goes through another intermediate period in which no reflux is employed, until such time as toluol is substantially eliminated from the mixture being distilled. The intermediate during this period is collected separately from the toluol previously distilled.

The distillation then enters the final period in which a reflux is employed consisting of solvent naphtha or xylol corresponding in boiling point range to the fraction desired to be recovered. When the condensate begins to differ from the reflux being employed, the distillation may either be ended or continued for a further period without refluxing to remove such quantities of solvent naphtha or xylol as remain in the rectifying column from the previous refluxing operation.

The residue remaining in the still tank at the end of the distillation is withdrawn and discarded or retained for any useful purpose and the still is recharged with a further quantity of light oil. The toluol intermediates collected from the previous distillation may at this time be added to the new charge.

It will be understood that these intermediates represent mixtures of the various fractions desired to be recovered, for example, a mixture of benzol and toluol, rather than materials of intermediate boiling points, and therefore the addition of intermediate oil from one operation to the oil being distilled in a subsequent operation does not increase the amount of intermediate produced in the subsequent operation, but may in fact tend to decrease the percentage of intermediate obtained. Moreover, the employment of refluxes in the manner described further tends to decrease the amount of intermediate material obtained.

In order that my invention may be more fully set forth and understood, I now describe, with reference to the accompanying drawing, a preferred manner in which it is practiced and embodied. In this drawing, The single figure is a more or less diagrammatic view, partly in elevation and partly in vertical cross-section, of apparatus for recovering light oils from absorbent oil previously employed to remove the same from gas, and for separately recovering in more or less purified form the constituents of the crude light oil obtained in this manner.

Referring to the drawing, the removal of the light oils from the gas is assumed to be accomplished in a scrubber or scrubbers of the usual type (not shown). The enriched wash oil returns from the scrubber through a conduit 1 and traverses coils 2 located within an oil-to-oil heat exchanger 3. The oil then passes through a conduit 4 into the wash oil still 5 which may be of conventional design as shown. The oil descending through the various sections of the wash oil still 5 is distilled by means of steam introduced through a conduit 6 to the bottom of the wash oil still 5 and is thereby stripped of all or nearly all of its burden of light oils.

The hot stripped wash oil leaving the bottom of the wash oil still 5 passes through a conduit 7 into the space within the light oil heat exchanger 3 surrounding the coils 2 and gives up most of its heat to the enriched oil about to enter the still 5. The partially cooled stripped wash oil then passes from the oil-to-oil heat exchanger 3 to a conduit 8 for further cooling and recirculation over the gas scrubbers as before.

The vapors from the wash oil still 5 which consist of the volatilized light oils and steam pass through a conduit 11 into coils or tubes 12 located within a continuous still 13 where they are brought into indirect heat-exchange relation with previously cooled and preferably washed condensate from the same source. During their passage through the coils or tubes 12 some condensation takes place and whatever condensate is formed passes through a conduit 14 into a condensate drain tank 15 while the uncondensed vapors pass through a conduit 16 to cooling coils 17 where they are condensed by means of water flowing over the outside of the coils 17. The condensate from the cooling coils 17 then passes through the conduit 18 into the condensate drain tank 15, together with the condensate flowing through the line 14.

The crude light oil condensate is separated in the tank 15 from any water which has condensed with it and is then delivered by means of a pump 21 through conduits 22 and 23 to the washing plant which is preferably, as stated hereinabove, of a continuous type. The particular type of washing apparatus illustrated and which is particularly suitable for the purposes of the present invention is that described and claimed in the aforesaid patent application of Alfons Kemper.

According to this process, the crude light oil is first delivered to a heat adjuster 24 where it is cooled or heated as required by the exigencies of the process and then passes to a series of agitators 25, 26, 27 and separating tanks 28 and 29, located in the order shown in the drawing. The oil is first treated in the agitator 25 with somewhat dilute sulphuric acid and the mixture of oil and acid overflows into the agitator 26 where water is added.

Conditions of treatment are so maintained that the treated impurities do not separate out from the oil but remain dissolved in the oil and when the mixture of oil and diluted acid overflows into the separating tank 28 the diluted acid may be withdrawn through a conduit 31 substantially uncontaminated with resinous or sludge producing constituents.

The oil overflows from the separating tank 28 into the agitator 27 where it is neutralized with caustic soda solution or similar alkali and finally passes into the separating tank 29 from which the spent caustic solution may be withdrawn through a conduit 32, while the washed oil passes through a conduit 33 into a continuous still 13.

In the continuous still 13 the condensate is subjected, as recited hereinabove, to indirect heat exchange with the subsequently produced vapors from the wash oil still 5 flowing through the coils 12. The heat contained in these vapors and the temperature thereof is sufficient to volatilize all of the fore-runnings and at least a major portion of the benzol contained in the condensed light oil without however effecting the removal of any toluol.

The vapors which are produced pass through a conduit 35 into a fractionating column 36 having dephlegmator 37. Any condensate reflux is returned to the still 13 through a conduit 38, while the vapors which traverse the dephlegmator 37 pass through a conduit 39 to a cooler 40 and thence through a conduit 42 into a storage tank 43.

In the instance shown in the drawing, the apparatus is arranged for the collection of only one product from the fractionating column 36, namely, a motor fuel consisting of a mixture of fore-runnings and benzol. However, where the recovery of such motor fuel is not desired, but it is on the contrary desired to produce the maximum amount of substantially pure benzol, the fractionating column 36 may be so constituted, after any well-known manner, as to effect the separate recovery of fore-runnings and benzol.

The light oil leaving the still 13 and containing no fore-runnings and at the most only a fraction of its original benzol content passes through a conduit 44 into a tank 45 which is preferably at least of such size as to contain a quantity of light oil equivalent to the amount recovered from the gas during one entire period of operation of the intermittent purification operation to be described hereinbelow and should preferably be of such size as to contain a quantity of light oil equal to that recovered during a twenty-four hour period.

When a sufficient quantity of light oil has accumulated in the tank 45, it is transferred through a conduit 46 to an intermittent still tank 47 of suitable size. The still tank 47 is of conventional type, being provided with steam coils 48, and is connected by a vapor line 49 and a return line 50 to the lower portion of a rectifying column 52. The rectifying column 52 is preferably of considerable height, for example, a column suitable for a typical plant may have a diameter of six feet or more and a total height of over sixty feet.

In the present instance, the rectifying column comprises principally a series of conventional superimposed bell-and-tray sections having the usual vapor up-takes surrounded by bubble caps or bells and having also the usual down-flow pipes for the oil so arranged as to maintain a proper seal of oil for the bubble caps. In the present instance where the space available in the lower portion 53 of the rectifying column 52 for condensate return is large, additional steam coils 54 are provided in this space 53 but in some cases, and particularly where the space 53 is smaller, the coils 54 may be omitted. In any event, the space 53 merely serves as an extension of the still tank 47.

As shown in the drawing, the rectifying column 52 is provided with a small number of sections 55 at the top thereof, the lowermost of which is not provided with a liquor down-flow pipe. Caustic soda solution is delivered from a circulating tank 56 by means of a pump 57 and a conduit 58 to the uppermost section 55 and is returned through a sealed conduit 59 to the tank 56.

At a point just below the upper sections 55, there is provided a reflux line 61 communicating through conduits 62, 63 and 64 having valves 65, 66 and 67 with a plurality of reflux flow tanks 68, 69 and 70, respectively. The reflux tanks 68, 69 and 70 are provided with heating coils 68a, 69a and 70a, respectively.

The distillation is conducted in the manner hereinabove described. At the start of the distillation, if the quantity of benzol in the mixture of oil being distilled is considerable, benzol is introduced from a tank 68 through lines 62 and 61 to the top of the rectifying column 52 to serve as reflux. At this time, the vapors passing from distilled tank 47 through the vapor line 49 into the fractionating column 52 may contain considerable quantities of toluol vapor but the latter, upon coming in contact with the benzol reflux, is condensed, with resultant re-volatilization of a portion of the reflux so that substantially pure benzol vapors pass out through the caustic sections 55, where they are purified from sulphur impurities, and through a vapor line 72 into the condensers 73 and 74.

The condensers 73 and 74 are located in series and a flow of cooling water is provided therethrough by means of conduits 75, 76 and 77. The condensates collecting in the condensers 73 and 74 are removed through lines 78 and 79, respectively, and may be delivered by means of valves 81 and 82 to receivers 83 and 84, respectively.

The receivers 83 and 84 are employed alternately and of such size as to hold a sufficient quantity of condensate to enable ready determination of the nature thereof. The contents may be released through valves 85 and 86, a conduit 87 and conduits 89, 90, 91 and 92 having valves 93, 94, 95 and 96 to any one of a plurality of tanks 98, 99, 100 and 101, respectively.

In the present instance, in the initial stage of distillation the condensate collected in the receiving tanks 83 and 84 consists of substantially pure benzol and is delivered to the benzol tank 99.

When the amount of benzol in the mixture being distilled in the still 47 and rectifying column 52 falls to such a point that the condensate collected in either one of the receivers 83 or 84 begins to show contamination with toluol, the valves 65 and 90 are closed, the valve 89 is opened, and the distillation is continued without employment of reflux until the amount of benzol remaining falls to a negligible point. The intermediate condensate which is collected during this period is delivered to the intermediate tank 98.

In some instances where the distillation in the still 13 has been sufficient to remove all but a very small amount of the benzol, the benzol reflux period may be omitted and the distillation may then commence with a period in which a benzol-toluol intermediate is obtained. In still other cases where the separation of benzol from the toluol has been especially thorough and sharp, both the benzol reflux period and the benzol-toluol intermediate period may be omitted.

When the amount of benzol in the mixture being distilled falls to a negligible point or, in the instance last mentioned, when the mixture with which the still is charged contains a negligible quantity of benzol, the valve 89 is closed, and valves 66 and 91 are opened. Substantially pure toluol is now introduced as a reflux through the conduit 61 into the rectifying column 52. This reflux serves to prevent, at least so long as there is any considerable quantity of toluol in the mixture being distilled, the escape from the rectifying column 52 of any substance having a higher boiling point than toluol, so that the mixture collected in the tanks 83 and 84 at this period consists of substantially pure toluol and may be delivered to the toluol tank 100.

When the amount of the toluol in the mixture being distilled in the tank 47 in the rectifying column 52 falls to such a point that an intermediate product tends to pass over through the vapor line 72, the valves 66 and 95 are closed, the valve 89 is opened, and the distillation enters a second intermediate period. The condensate collected in the tanks 83 and 84 is now delivered to the intermediates tank 98 as before.

When the quantity of toluol in the mixture being distilled falls to a negligible point, the valve 89 is closed, and valves 67 and 92 are opened. A reflux is now delivered from the tank 70 to the rectifying column 52 which corresponds as precisely as possible to the fraction next to be collected. In some instances, this may comprise a mixture consisting substantially entirely of xylols but in most instances it will comprise the mixture of materials having boiling points higher than that of toluol which is known as solvent naphtha.

This refluxing period is continued, the condensate being delivered meanwhile to the xylol or solvent naphtha tank 101, until the condensate shows contamination with undesirable constituents, at which time the valve 67 is closed. The distillation may then be discontinued or a further fraction may be obtained in the manner already described with respect to the lower boiling fractions.

As shown in the drawing, the reflux oils may be obtained from the tanks 99, 100 or 101, being delivered by pumps 103, 104 and 105 and lines 106, 107, and 108 to the tanks 68, 69 and 70, respectively, or they may be obtained from any other source.

The residue remaining in the still 47 is withdrawn through a conduit 110 having a valve 111 and the tank may then be recharged with a fresh quantity of light oil from the tank 45. At this or any subsequent period, the contents of the tank 98 may be delivered through a conduit 112 having a valve 113 and the conduit 46 into the still tank 47. While this is the preferred procedure, it may, in some instances, be desirable to accomplish the re-distillation of the intermediates separately and this may be done in the manner described above with reference to the distillation of the light oil proper.

In some instances, the requirements for a motor fuel may be so much less stringent than the requirements for pure toluol that an acid washing operation, which would be sufficiently thorough for the preparation of motor fuel, would be insufficient to produce a satisfactory toluol and when this is true, I have found it advantageous to limit the extent of this acid washing operation, accomplished prior to the distillation in the still 13, to such a point as to be merely sufficient for the production of motor fuel and to accomplish a more thorough washing such as will be suitable for toluol requirements at a subsequent point.

For example, as shown in the drawing, the partially or wholly debenzolized oil contained in the tank 45 may be delivered to a supplemental series of agitators 120, 121 and 123 and separating tanks 124 and 125 arranged in the order shown and similar in operation to the series of agitators and separating tanks 25 to 29, inclusive. The operation which takes place may be similar to the washing operation which takes place prior to the introduction of the light oil in the still 13 except that a more thorough washing is desirable.

The amount of refluxing oil added to the column 52 will vary according to the amount of vapors ascending the column, the constitution of the vapors, the temperature of the vapors and of the oil, and are best determined by the operator. In general, the amount of reflux at any time is always less than the amount of similar oil in the vapors at the time, and the temperature of the reflux is preferably maintained at a temperature as close to the boiling point thereof as is practicable, though lower temperatures can be employed.

The terms "pure products" and "substantially pure", as used hereinabove, are intended to designate substances which, while not necessarily chemically pure, are nevertheless substantially uncontaminated with undesired constituents, and correspond with the products known in the art as "commercially pure" and by equivalent expressions.

It will be obvious to those skilled in the art that my invention is not limited to the specific illustrative examples given hereinabove but may variously be practiced in accordance with the particular results desired. It will also be obvious that the various steps of my process may be separately employed or modified without departing from the scope of the invention considered as a whole.

Consequently, my invention is not limited to the specific details given hereinabove by way of illustrative example, but may be embodied and practiced within the scope of the claims hereinafter made.

I claim as my invention:

1. In the process of distilling a hydrocarbon oil containing a small number of constituents of widely different boiling points for the recovery of said constituents in substantially pure form, the steps which comprise heating the oil to vaporize the constituent of lower boiling point, passing the vapors thereof through a rectifying column, condensing said vapors, introducing said constituent in substantially pure form to said column as reflux and discontinuing said introduction of reflux when the constituent of next higher boiling point appears in the distillate.

2. The process of distilling and separating benzol and toluol from a mixture thereof which comprises heating said mixture to vaporize benzol, passing benzol vapors through a rectifying column, condensing benzol vapors from said column, refluxing substantially pure benzol to an intermediate portion of said column, discontinuing said refluxing when toluol appears in the distillate and vaporizing the toluol from the residue of said mixture when benzol disappears from the distillate.

3. The process of distilling and separating benzol and toluol constituents from a mixture containing them which comprises heating said mixture to vaporize at least one of said constituents, passing the resultant vapors through a rectifying column, condensing said vapors, introducing substantially pure benzol as reflux to an intermediate portion of said column and discontinuing said refluxing when toluol appears in the distillate.

4. The process of distilling and separating benzol and toluol from a mixture containing them which comprises heating the mixture to vaporize the benzol and toluol, passing the resultant vapors through a rectifying column, condensing vapors leaving said column, introducing substantially pure benzol as reflux to an intermediate portion of said column, discontinuing said introduction of reflux when toluol appears in the condensate, and introducing toluol in substantially pure form as reflux to an intermediate portion of said column when the benzol disappears from the mixture being distilled.

5. The process of distilling a mixture of benzenoid hydrocarbon oils having different boiling points for the recovery therefrom of constituent oils in purified form, which comprises charging a quantity of said mixture into a distilling vessel, applying heat to said mixture to volatilize at least a portion of the constituent oil having the lowest boiling point and continuing the application of heat until said constituents have been substantially eliminated, passing the resultant vapors through a rectifying column, introducing to said column at a point beyond the point of introduction of said vapors, during such time as the mixture being distilled contains a substantial proportion of a constituent having a boiling point lower than the boiling points of other constituents present in the mixture being distilled, a reflux comprising an oil substantially identical with said constituent, withdrawing and condensing uncondensed vapors from said column at a point beyond the point of introduction of said reflux, and at such times as the mixture being distilled contains such a small proportion of a constituent having a boiling point lower than the boiling points of other constituents present in the mixture being distilled that the condensate contains said other and higher boiling constituents, discontinuing the introduction of reflux.

6. The process of distilling a mixture of benzol and toluol for the recovery therefrom of said benzol and toluol in purified form, which comprises charging a quantity of said mixture into a distilling vessel, applying heat to said mixture to volatilize benzol and continuing the application of heat to volatilize toluol, passing the resultant vapors through a rectifying column, introducing to said column at a point beyond the point of introduction of said vapors and during such time as the mixture being distilled contains a substantial proportion of benzol, a reflux comprising benzol in substantially pure form, withdrawing uncondensed vapors from said column at a point beyond the point of introduction of said reflux and condensing the same, and when the proportion of benzol in the mixture being distilled falls to such a point that the condensed vapors contain toluol, discontinuing the introduction of said reflux benzol.

7. The process of distilling a mixture of benzol, toluol and analogous substances of higher boiling points for the recovery therefrom of benzol and toluol in purified form, which comprises charging a quantity of said mixture into a distilling vessel, applying heat to said mixture to volatilize at least a portion thereof and continuing the application of heat until said benzol and at least a bulk of said toluol have been substantially eliminated, passing the resultant vapors through a rectifying column, withdrawing uncondensed vapors from said column and condensing the same, introducing to said column at an intermediate point between the point of introduction of said vapors and the point of withdrawal of said other vapors, during such time as the mixture being distilled contains a substantial proportion of benzol, a reflux comprising substantially pure benzol, discontinuing the addition of said reflux benzol when the proportion of benzol in the mixture being distilled falls to such a point that the condensate of the vapors withdrawn from said rectifying column contains toluol, continuing the application of heat to said mixture until the proportion of benzol being distilled falls to a negligible point, then introducing to said intermediate point a reflux comprising substantially pure toluol, and separately condensing the vapors withdrawn from said rectifying column during said periods of refluxing with benzol, of operation without refluxing and of refluxing with toluol, respectively.

8. The process of distilling a mixture of benzenoid hydrocarbon oils having different boiling points for the recovery therefrom of constituent oils in purified form, which comprises charging a quantity of said mixture into a distilling vessel, applying heat to said mixture, passing the resultant vapors upward through a fractionating column, introducing during such time as the mixture being distilled contains a substantial percentage of oil having a boiling point lower than those of other constituents of the mixture, a reflux consisting of oil substantially identical with said oil of lower boiling point in substantially pure form, withdrawing vapor from the fractionating column at a point above the point of introduction of said reflux, condensing the same, and when the amount of said oil of lower boiling point in the mixture being distilled falls to such a point that the condensate obtained differs substantially from said reflux, changing said reflux to consist of oil substantially identical with the next higher boiling constituent desired to be recovered, and separating all condensed oil intermediate between said oils desired to be recovered from the condensate comprising said oils.

9. The process of recovering substantially pure benzol and toluol from a mixture consisting of benzol, toluol and higher boiling substances which comprises, charging a quantity of said mixture into a distilling vessel, applying heat to said mixture to vaporize benzol therefrom and passing the resultant vapors through a fractionating column, introducing substantially pure benzol as reflux into said fractionating column so long as the mixture being distilled contains a substantial proportion of benzol, withdrawing vapors therefrom and condensing the same, continuing the application of heat to the mixture to volatilize toluol therefrom, changing said reflux to substantially pure toluol when the amount of benzol in the mixture being distilled falls to such a point that the condensed oil represents an intermediate of benzol and toluol, and separating all condensed intermediate oil from condensed substantially pure benzol and substantially pure toluol, respectively.

10. The process of recovering benzol and analogous hydrocarbons from enriched heavy absorbent oil previously employed to remove said benzol hydrocarbons from fuel gas, which comprises steam distilling the enriched absorbent oil to vaporize therefrom said benzol and analogous hydrocarbons, subjecting the hot vapors thereby released to indirect heat exchange with previously condensed condensate from a further quantity of said vapors, whereby at least a partial condensation of said hot vapors is effected and at least a portion of said previously condensed condensate is volatilized, and removing and condensing the volatilized portion of said previously condensed condensate separately from said hot vapors and the condensate thereof resulting from said heat exchange.

11. The process of recovering benzol and analogous hydrocarbons from enriched heavy absorbent oil previously employed to remove said benzol hydrocarbons from fuel gas, which comprises steam distilling the enriched absorbent oil to vaporize therefrom said benzol and analogous hydrocarbons, condensing vapors thereby produced, subjecting the condensate thereby obtained to indirect heat exchange with subsequently produced hot vapors from said steam distillation of absorbent oil, whereby at least a portion of the benzol contained in said condensate is vaporized, removing the so vaporized benzol of said condensate and condensing the same separately from said hot vapors and condensate thereof, and withdrawing the unvaporized benzol-freed portion of the condensate from said heat-exchange relation.

12. The process of recovering benzol and analogous hydrocarbons from enriched heavy absorbent oil previously employed to remove said benzol hydrocarbons from fuel gas, which comprises steam distilling the enriched absorbent oil to vaporize therefrom said benzol and analogous hydrocarbons, condensing vapors thereby produced, treating the condensate thereby obtained to free it from impurities having boiling points approximate to those of benzol and toluol, subjecting the condensate thereby obtained to indirect heat exchange with subsequently produced vapors from said steam distillation of absorbent oil, whereby at least a portion of said condensate is volatilized, removing and condensing the volatilized portion and separately withdrawing the remaining portion of said condensate.

13. The process of recovering benzol and analogous hydrocarbons from enriched heavy absorbent oil previously employed to remove said benzol hydrocarbons from fuel gas, which comprises steam distilling the enriched absorbent oil to vaporize therefrom said benzol and analogous hydrocarbons, condensing vapors thereby produced, treating the condensate thereby obtained to free it from impurities having boiling points approximate to those of benzol and toluol, subjecting the condensate thereby obtained to indirect heat exchange with subsequently produced vapors from said steam distillation of absorbent oil, whereby at least a portion of said condensate is volatilized, removing and condensing the volatilized portion, separately withdrawing the remaining portion of said condensate and subjecting said remaining portion of said condensate to further distillation for the separation of its constituents.

14. The process of recovering benzol, toluol and analogous hydrocarbons from enriched heavy absorbent oil previously employed to remove said benzol hydrocarbons from fuel gas, which comprises steam distilling the enriched absorbent oil to vaporize therefrom said benzol, toluol and analogous hydrocarbons, condensing vapors thereby produced, treating the condensate thereby obtained to free it from impurities having boiling points approximate to that of benzol, subjecting the treated condensate to indirect heat exchange with subsequently produced vapors from said steam distillation of absorbent oil, whereby the bulk of the benzol contained in said condensate is vaporized, removing and condensing the volatilized portion, separately withdrawing the remaining portion of said condensate, treating said remaining portion to free it from impurities having boiling points approximate to that of toluol and then subjecting it to further distillation for recovery of toluol therefrom.

15. The process of recovering benzol and analogous hydrocarbon oils from an enriched relatively nonvolatile hydrocarbon oil previously employed to remove said benzol hydrocarbons from fuel gas, which comprises steam distilling said enriched hydrocarbon oil to volatilize and drive off said benzol and analogous hydrocarbon oils as vapors, subjecting hydrocarbon condensate obtained from said vapors to indirect heat exchange with a stream of hot hydrocarbons leaving said steam distillation stage, and removing and condensing the thereby volatilized portion of said condensate and separately from the vapors of said stream of hot hydrocarbons and condensate thereof caused by said heat exchange.

In testimony whereof, I have hereunto subscribed my name this 19th day of July, 1930.

JOSEPH VAN ACKEREN.